US007650487B2

(12) United States Patent
Chaudhry et al.

(10) Patent No.: US 7,650,487 B2
(45) Date of Patent: Jan. 19, 2010

(54) METHOD AND STRUCTURE FOR COORDINATING INSTRUCTION EXECUTION IN OUT-OF-ORDER PROCESSOR EXECUTION USING AN INSTRUCTION INCLUDING AN ARTIFICIAL REGISTER DEPENDENCY

(75) Inventors: Shailender Chaudhry, San Francisco, CA (US); Paul Caprioli, Mountain View, CA (US); Sherman H. Yip, San Francisco, CA (US)

(73) Assignee: Sun Microsystems, Inc., Menlo Park, CA (US)

( * ) Notice: Subject to any disclaimer, the term of this patent is extended or adjusted under 35 U.S.C. 154(b) by 0 days.

(21) Appl. No.: 11/371,143

(22) Filed: Mar. 8, 2006

(65) Prior Publication Data
US 2007/0226465 A1 Sep. 27, 2007

(51) Int. Cl.
*G06F 9/44* (2006.01)
(52) U.S. Cl. .................. 712/220; 712/245; 712/208
(58) Field of Classification Search ................ 712/220, 712/208, 245
See application file for complete search history.

(56) References Cited
U.S. PATENT DOCUMENTS
5,712,791 A * 1/1998 Lauterbach .................. 716/4

| 5,898,853 | A | * | 4/1999 | Panwar et al. ............... 712/216 |
| 6,112,282 | A | * | 8/2000 | Lynch .......................... 711/145 |
| 2003/0149862 | A1 | * | 8/2003 | Kadambi ..................... 712/217 |
| 2004/0199753 | A1 | * | 10/2004 | Thimmannagari et al. .. 712/242 |
| 2004/0215941 | A1 | * | 10/2004 | Thimmannagari et al. .. 712/228 |

OTHER PUBLICATIONS

SpecC Modeling Guidelines, Andreas Gerstlauer, Apr. 12, 2002.*
U.S. Appl. No. 11/277,716, filed Mar. 28, 2006, and naming as inventor(s) Shailender Chaudhry, Paul Caprioli, Quinn A. Jacobson, and Marc Tremblay.
U.S. Appl. No. 11/277,735, filed Mar. 28, 2006, and naming as inventor(s) Shailender Chaudhry, Paul Caprioli, Quinn A. Jacobson, and Marc Tremblay.

* cited by examiner

*Primary Examiner*—Eddie P Chan
*Assistant Examiner*—William B Partridge
(74) *Attorney, Agent, or Firm*—Gunnison, McKay & Hodgson, L.L.P.; Forrest Gunnison

(57) ABSTRACT

A technique for coordinating execution of instructions in a processor that allows instructions to execute out-of-order includes decoding a particular instruction that is defined in accordance with an instruction set of the processor. A helper sequence of instructions that corresponds to the particular instruction is then introduced into a stream of executable operations. The corresponding helper sequence includes a first artificial dependency instruction that codes a dependency on a register that is not actually employed as a register source or target for an operation performed by the particular instruction.

25 Claims, 3 Drawing Sheets

US 7,650,487 B2

METHOD AND STRUCTURE FOR COORDINATING INSTRUCTION EXECUTION IN OUT-OF-ORDER PROCESSOR EXECUTION USING AN INSTRUCTION INCLUDING AN ARTIFICIAL REGISTER DEPENDENCY

FIELD OF THE INVENTION

The invention generally relates to the field of computers and, more particularly, to a technique for executing selected instructions in order in an otherwise out-of-order processor.

DESCRIPTION OF THE RELATED ART

A variety of instruction set architectures (ISAs) for computer systems have implemented instructions that perform conditional moves. For example, the SPARC® Version 9 ISA includes a move integer register on condition (MOVcc) instruction that copies content of a designated source integer register to a designated destination integer register, if a condition is satisfied. SPARC architecture based processors are available from Sun Microsystems, Inc., Palo Alto, Calif. SPARC trademarks are used under license and are trademarks or registered trademarks of SPARC International, Inc. in the United States and other countries. Products bearing SPARC trademarks are based upon an architecture developed by Sun Microsystems, Inc.

In a conditional move instruction, the condition to test is specified in the instruction and may be, for example, any of the conditions allowed in a conditional delayed control transfer instruction (DCTI). The move always (e.g., MOVA % icc, % rs or imm11, % rd) instruction is one example of a conditional move instruction. The MOVA instruction copies content of a designated source register (rs) or immediate field (imm11) to a designated destination register (rd).

A number of pipelined processors have also implemented helper stores, which provide a sequence of instructions (commonly referred to as microcode) to replace a single instruction. In general, helper stores have been utilized to implement functionality that a designer has decided against implementing directly in hardware. Unfortunately, in out-of-order execution machines that are highly speculative, the utilization of helper instruction sequences may provide erroneous results if an interrupt or trap is taken before the instruction sequence has completed. In this case, the architectural state of the computing apparatus may be incorrect. In a usual case, multiple instructions have been implemented within a helper instruction sequence to ensure that the integrity of the architectural state of the computing apparatus is maintained. Unfortunately, increasing the number of instructions to perform a given task generally increases a required size of a helper store and requires additional clock cycles to complete the given task.

As such, it would be desirable to provide a single instruction, in one form or another, that may be used to maintain the integrity of the architectural state of a computing apparatus. It would also be desirable for the single instruction to provide a mechanism to ensure execution order of an instruction sequence.

SUMMARY

According to various aspects of the present invention, a technique for coordinating execution of instructions in a processor is disclosed that allows the instructions to execute out-of-order. The technique includes decoding a particular instruction that is defined in accordance with an instruction set of the processor. A helper sequence of instructions, that corresponds to the particular instruction, is then introduced into a stream of executable operations. The corresponding helper sequence includes a first artificial dependency instruction that codes a dependency on a register that is not actually employed as a register source or target for an operation performed by the particular instruction.

According to another embodiment of the present invention, the first artificial dependency instruction is implemented as an instruction that depends, for readiness to execute, upon plural register sources but employs less than all of the register sources in its computation or data manipulation. According to another aspect, the first artificial dependency instruction is implemented as a move operation that depends, for readiness to execute, upon plural register sources but employs only one of the registers as a source for the implemented move. According to another embodiment, the first artificial dependency instruction is implemented as a no operation (NOP) instruction that depends, for readiness to execute, upon at least one register source but performs no computation or data manipulation that alters architectural state. In another embodiment, the first artificial dependency instruction is positioned last in the helper sequence to gather dependencies and ensure completion of other instructions of the helper sequence prior to commitment of the particular instruction implemented thereby.

In yet another embodiment, the helper sequence includes at least an additional second artificial dependency instruction that, together with the first artificial dependency instruction, is employed to expand a set of registers upon which execution of the first artificial dependency instruction ultimately depends. According to this aspect of the present invention, the first artificial dependency instruction codes dependencies on a first register source and on a register target of the second artificial dependency instruction, which itself codes a dependency on a second register source, such that execution of the first artificial dependency instruction ultimately depends on both the first and second register sources. The artificial dependency instruction may also be positioned between two instructions of the helper sequence to enforce an ordering therebetween.

These and other aspects of the described invention will be better described with reference to description of the embodiments and accompanying figures.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
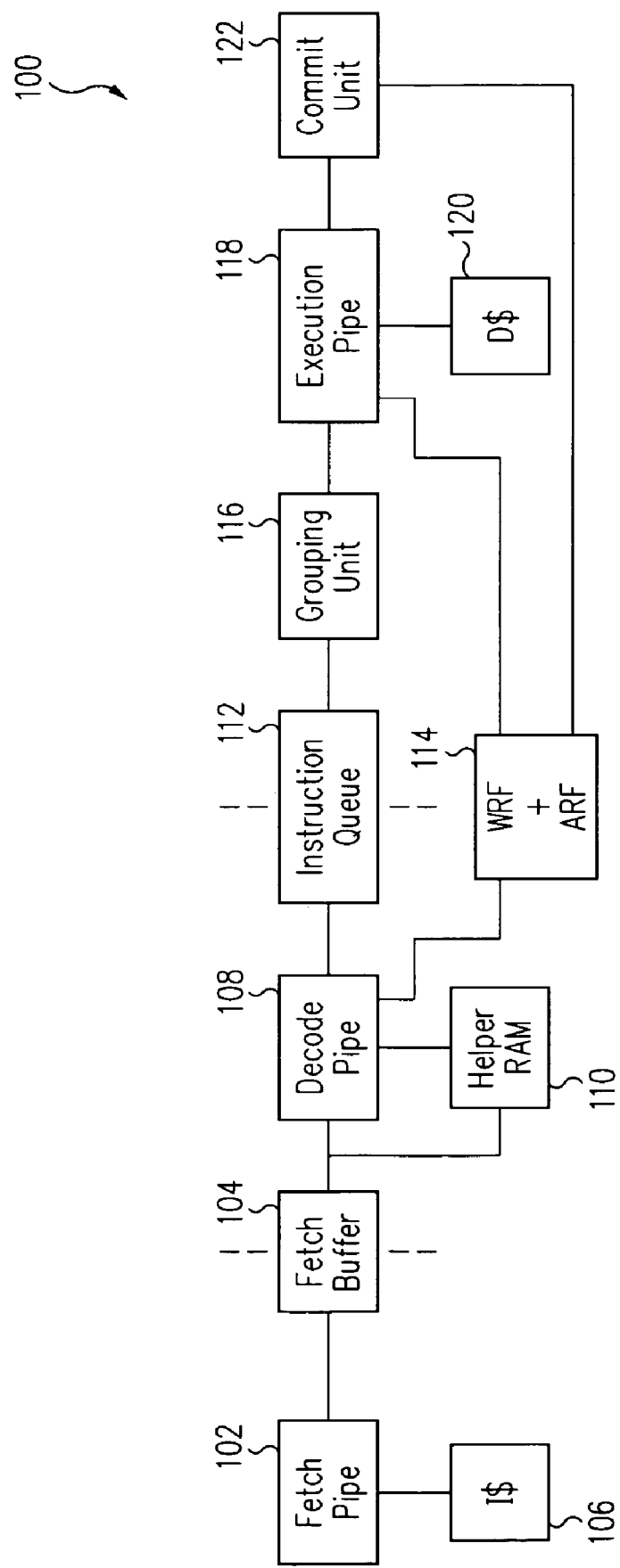
FIG. 1 depicts a relevant portion of an exemplary processor pipeline, constructed according to one embodiment of the present invention.

According to various aspects of the present invention, a technique for coordinating execution of instructions in a processor is disclosed that generally allows instructions to execute out-of-order, while selected instructions are executed in-order. The technique includes decoding a particular instruction that is defined in accordance with an instruction set of the processor. A helper sequence of instructions that corresponds to the particular instruction is then introduced into a stream of executable operations. The corresponding helper sequence includes a first artificial dependency instruction that codes a dependency on a register that is not actually employed as a register source or target for an operation performed by the particular instruction. For example, a computing apparatus may implement a single instruction that performs both an artificial dependency check on a register utilized by a prior instruction and a move between a source register and a destination register of a processor.

It should be appreciated that the single instruction, in addition to performing an artificial dependency check, may perform a different function, other than a register move, or no function at all (e.g., a no operation (NOP)). In one embodiment, the single instruction is implemented as a move register always instruction (MOVRA), which is positioned as a last instruction in a helper instruction sequence of a complex instruction. In this embodiment, the MOVRA instruction gathers all dependencies (order and/or data) and retires all instructions of the helper instruction sequence and may generally be considered a variant of a conditional move. In this manner, the corresponding complex instruction is ensured to be atomic with respect to memory and with respect to interrupts and traps. It should be appreciated that use of a single instruction to ensure dependency is particularly desirable when implemented in a machine that implements multiple levels of speculation and helper instruction sequences.

For example, when a load to a register (e.g., register 'r9') that is higher in an instruction stream than a later instruction (e.g., SWAP [% r7+% r8], % r9) that utilizes the content of the register is a cache miss, an unready value contained within the register 'r9' may be, for example, used in the later instruction. An exemplary instruction sequence for the instruction SWAP [% r7+% r8], % r9, which atomically exchanges what is stored in memory at an address specified by the content of registers 'r7'+'r8' with the content of register 'r9', is set forth below:

| LDUW, L | [%r7 + %r8], %t1 |
| STW, U | %r9, [%r7 + %r8] |
| MOVRA | %r9, %t1, %r9 |

In the example above, the SWAP instruction is, in fact, implemented with three instructions, which share a program counter (PC) value with the SWAP instruction. A first instruction of the sequence, i.e., a lock variation of the load unsigned word (LDUW, L) instruction, locks memory and loads the content of a memory location (at an address specified by the content of the registers 'r7'+'r8' into a temporary register 't1'. A second instruction, i.e., an unlock variation of a store word (STW, U) instruction, stores the content of the register 'r9' into the memory location at the address specified by the content of the registers 'r7'+'r8', and then unlocks memory. A final instruction in the sequence, i.e., a move register always (MOVRA) instruction, waits until the register 'r9' is valid and ready before moving the content of the temporary register 't1' to the register 'r9'. When the MOVRA instruction completes, the helper instruction sequence associated with the MOVRA instruction is also complete. It is contemplated that the MOVRA instruction may be useful in a variety of different applications, some of which are discussed in further detail below. The examples provided herein are not intended to limit the applications in which a single instruction with an artificial dependency may be utilized or implemented.

With reference to FIG. 1, a relevant portion of an exemplary processor pipeline 100 is depicted that includes a fetch pipe 102 that is coupled to an instruction store, e.g., a level 1 (L1) cache memory, 106. It should be understood that an exemplary computing system or apparatus may implement multiple processor cores, e.g., 16 cores, each having multiple processor pipelines, e.g., 4 pipelines per core, on a single integrated circuit (IC) and may include multiple of such ICs. An output of the fetch pipe 102 is provided to a fetch buffer 104, which functions to decouple the fetch pipe 102 from subsequent pipes in the pipeline 100. As is shown in FIG. 1, a helper store 110, e.g., a programmable helper random access memory (RAM), is coupled to an output of the fetch buffer 104. The helper store 110 includes microcoded instructions that provide helper instruction sequences, when appropriate, to the decode pipe 108. In general, the helper store 110 implements instructions that, for various reasons, a designer has decided not to implement directly in hardware. As is usual, the decode pipe 108 includes one or more stages that function to decode instructions. The decode pipe 108 is coupled to the instruction queue 112, which may also serve to decouple the decode pipe 108 from later stages of the pipeline 100.

A register file 114, including a working register file (WRF) and an architectural register file (ARF), is coupled to the decode pipe 108, an execution pipe 118 and a trap and commit unit 122. It should be appreciated that while the WRF and ARF are shown combined, the WRF and ARF may be, in fact, implemented as separate files for each pipeline. Alternatively, a single register file may be implemented. Instructions stored in the instruction queue 112 may be grouped, by grouping unit 116, for execution by the execution pipe 118. The execution pipe 118 is coupled to the commit unit 122, which commits executed instructions to architectural state in the ARF. This unit automatically disables interrupts after the first instruction in a helper sequence and re-enables them after the last instruction in a helper sequence commits. A data cache 120 is coupled to the execution pipe 118 and provides data to the execution pipe 118.

As noted above, the MOVRA instruction may be implemented as a last instruction in a helper instruction sequence. As noted above, in this implementation, the MOVRA instruction gathers dependencies and re-enables traps and interrupts, such that a helper instruction sequence is atomic with respect to traps and interrupts, as well as memory. According to one aspect of the present invention, the MOVRA instruction is the only instruction in the helper instruction sequence that actually modifies the content of a real physical register, i.e., a working data register. In essence, in this application, the MOVRA instruction ensures that a working data register is valid and ready before writing content of a temporary register to the working data register. In this manner, the MOVRA instruction accomplishes in a single instruction what would normally require at least two instructions. Thus, the size of the helper store may generally be smaller in size than a helper store configured according to the prior art. In one embodiment, the MOVRA instruction is an illegal instruction, if directly coded. The use of an illegal instruction is facilitated by the fact that the helper store 110 is implemented downstream of legal instruction checking, which is typically performed in, for example, the fetch pipe 102. However, it should be appreciated that the MOVRA instruction may be defined as a legal instruction in an instruction set architecture (ISA), if desired. The functionality of the MOVRA instructions could be, for example, performed by the exemplary instructions set forth below:

---
XOR %r9, %t1, %t2
XOR %r9, %t2, %r9
---

In the above example, the second exclusive OR (XOR) instruction is added to the above code to undo the first XOR instruction. It should be, however, noted that the implementation of the two XOR instructions requires two clock cycles to execute and requires twice the storage of the MOVRA instruction.

Figure 2:
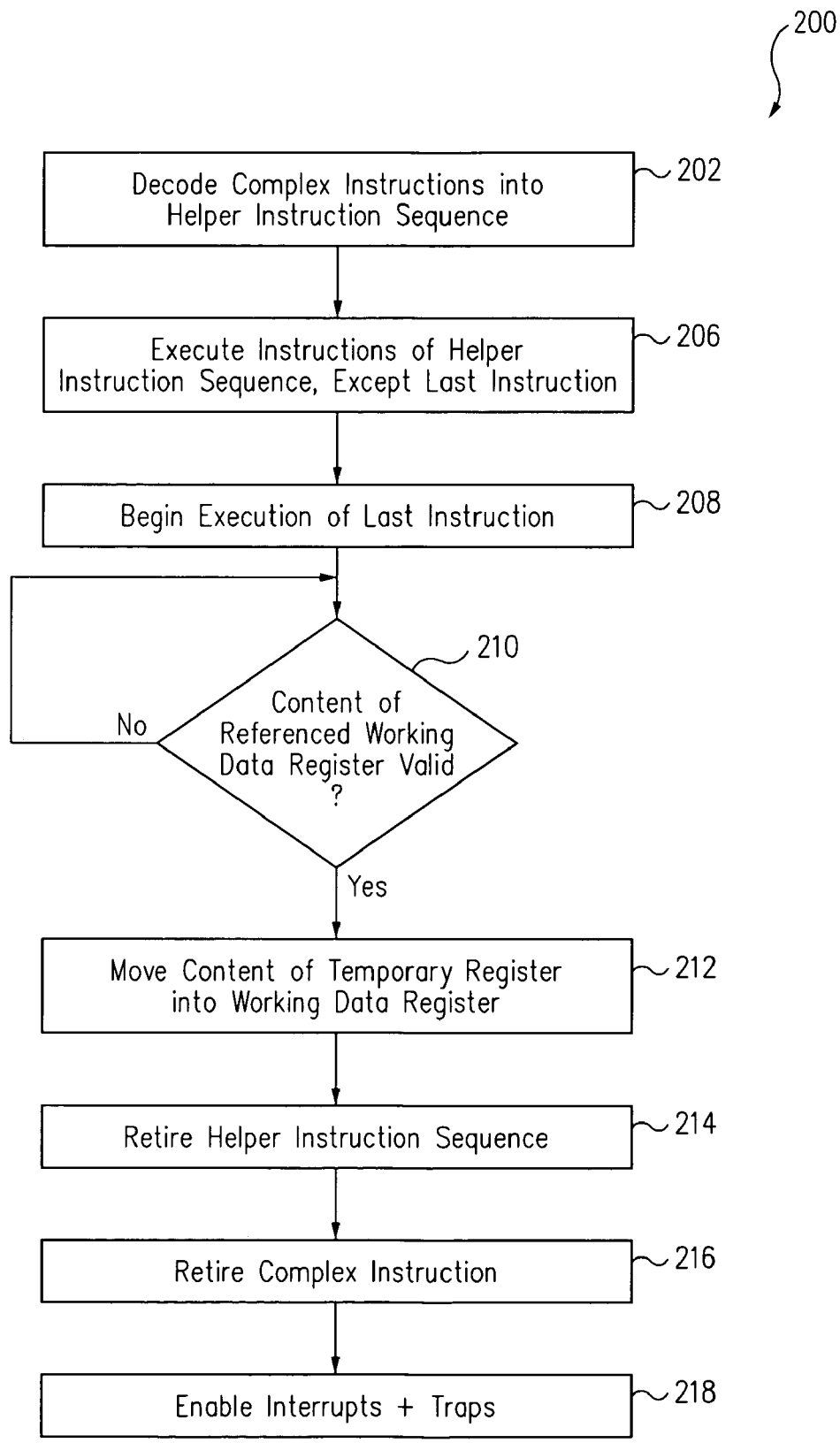
FIG. 2 depicts an exemplary flow chart for implementing a helper instruction sequence, according to one aspect of the present invention.

With reference to FIG. 2, a flowchart of a process 200 is depicted which implements a helper instruction sequence for a computing apparatus according to one embodiment of the present invention. At block 202, a complex instruction is decoded into a helper instruction sequence through the use of the helper store 110. In a typical case, one or more pre-decode bits associated with a pre-decoded instruction may be used to indicate that the helper store 110 is to provide an associated helper instruction sequence. Then, at block 206, all instructions in the helper instruction sequence are executed, except a last instruction in the helper instruction sequence. Next, at block 208, execution of the last instruction in the helper sequence is initiated.

Then, at decision block 210, it is determined whether the content of a designated referenced working data register is valid. It should be appreciated that typically one would not be concerned with the validity of the content of a register that was to be written. However, in this context, doing so ensures that a macrocoded instruction, e.g., the SWAP instruction, is atomic with respect to memory and interrupts. If the content of the referenced working data register is valid in block 210, control transfers to block 212. Otherwise, control loops on block 210. In block 212, when the content of the referenced working data register is valid, the content of the temporary register is moved into the working data register. Then, in block 214 the helper instruction sequence is retired. Next, in block 216 the complex instruction, that corresponds to the helper instruction sequence, is retired. Finally, at block 218 interrupts and traps are enabled.

The described invention may be provided as a computer program product, or software, that may include a machine-readable medium having stored thereon instructions, which may be used to program a computer system (or other electronic devices) to perform a process according to the present invention. A machine readable storage medium may include any mechanism for storing information in a tangible form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

As another example, embodiments of the present invention may be implemented when it is desirable to guarantee an issue order between instructions. For example, in the case where hardware normally allows two load instructions to issue out-of-order and the load instructions are directed to input/output (I/O) space, e.g., to an Ethernet card or graphics device, it may be desirable to force the load instructions to be in program order due to some device restriction. For example, the instruction sequence:

---
LD [addr1], %r1
LD [addr2], %r2
--- may be implemented according to an embodiment of the present invention as the following instruction sequence:

---
LD      [addr1], %r1
MOVRA   %r1, %r2, %r2
LD      [addr2], %r2
--- to cause the load instructions to issue in program order. In this case, issue logic examines the middle instruction (i.e., the MOVRA instruction) and determines that register 'r1' data must be available before the middle instruction can issue, even though the MOVRA instruction does not utilize the register 'r1' data. Further, as the middle instruction is writing to register 'r2', the issue logic determines that the second load instruction in the sequence cannot issue until the MOVRA instruction has issued. It should be appreciated that the always condition is true regardless of the register 'r1' data, such that the instruction MOVRA instruction performs the function provided by the traditional move instruction, i.e., MOV % r2 , % r2 , which does not actually alter the content of the register 'r2'. However, unlike the traditional move instruction, in this application the move register always (MOVRA) instruction functions as an artificial dependency instruction that is positioned between two instructions of the helper sequence to enforce an ordering therebetween.

According to various other embodiments of the present invention, multiple MOVRA instructions may be chained to cover more complex dependencies in an instruction sequence. For example, a compare and swap extended from alternate space (CASXA) instruction, which is used for synchronization and memory updates by concurrent processes, may implement multiple MOVRA instructions. For example, the instruction CASXA [% r1], % r2 , % r3 (which compares the value in source register 'r2' with the content of a memory at an address specified by the content of source register 'r1' and swaps the content of the register 'r3' with the content of the memory at the address specified by register 'r1' when the values are equal and otherwise replaces the value in register 'r3' with the content of the memory location at the address specified by register 'r1') may be implemented by the following exemplary helper instruction sequence:

---
LDXA, L    [%r1], %t1
MOVRA      %t1, %r3, %t2
SUB        %t1, %r2, %t3
MOVRNZ     %t3, %t1, %t2
STXA, U    %t2, [%r1]
MOVRA      %t2, %t1, %r3
---

In the above example, the lock variant of the load extended from alternate space (LDXA, L) instruction loads data at a memory address specified by the content of register 'r1' into destination register 't1'. The first MOVRA instruction then moves the content of source register 'r3' into destination register 't2', dependent upon register 't1'. The subtract (SUB) instruction subtracts the content of source register 'r2' from the content of source register 't1' (which is used to compare the data loaded into the register 't1' with that in register 'r2') and stores the difference in the register 't3'. The move if register not zero (MOVRNZ) instruction moves the data in source register 't1' into destination register 't2' if the value stored in the register 't3' is not zero.

The unlock variation of the store extended into alternate space (STXA, U) instruction stores the content of register 't2' into memory at an address specified by the content of register 'r1'. The second MOVRA instruction in the sequence moves the content of source register 't1' into destination register 'r3', dependent upon register 't2'. It should be noted that the first MOVRA instruction is artificially dependent upon the register 't1' and the second MOVRA instruction is artificially dependent upon the register 't2', which is a destination register for the first MOVRA instruction. In this application, the second MOVRA instruction functions as a second artificial dependency instruction that, together with a first artificial dependency instruction, i.e., the first MOVRA instruction, is employed to expand a set of registers upon which execution of the first artificial dependency instruction ultimately depends. According to this aspect of the present invention, the first artificial dependency instruction codes dependencies on a first register source and on a register target of the second artificial dependency instruction, which itself codes a dependency on a second register source, such that execution of the first artificial dependency instruction ultimately depends on both the first and second register sources.

As another example of using the MOVRA instruction to enforce order, a traditional block store may be performed by the follow exemplary helper instruction sequence:

| | |
|---|---|
| STX %r1, [addr + 0] | |
| STX %r2, [addr + 8] | |
| STX %r3, [addr + 16] | |
| STX %r4, [addr + 24] | |

However, in an out-of-order processor, the store extended (STX) instructions may not execute in order. Assuming that it is desirable to perform the STX instructions in program sequence, the helper instruction sequence may be coded as:

| | |
|---|---|
| STX | %r1, [addr + 0] |
| MOVRA | %r1, %r2, %r2 |
| STX | %r2, [addr + 8] |
| MOVRA | %r2, %r3, %r3 |
| STX | %r3, [addr + 16] |
| MOVRA | %r3, %r4, %r4 |
| STX | %r4, [addr + 24] |

According to the above helper instruction sequence, each of the MOVRA instructions has an artificial dependency on the data register of an immediately prior STX instruction and, thus, the next STX instruction cannot execute until an artificial dependency of a preceding MOVRA instruction is satisfied.

It should be appreciated from the discussion herein that artificial dependencies may be included within instructions that perform functions other than a register move. For example, a no operation (NOP) instruction, which performs no computation or data manipulation that alters architectural state, may be modified to provide an artificial register dependency.

Figure 3:
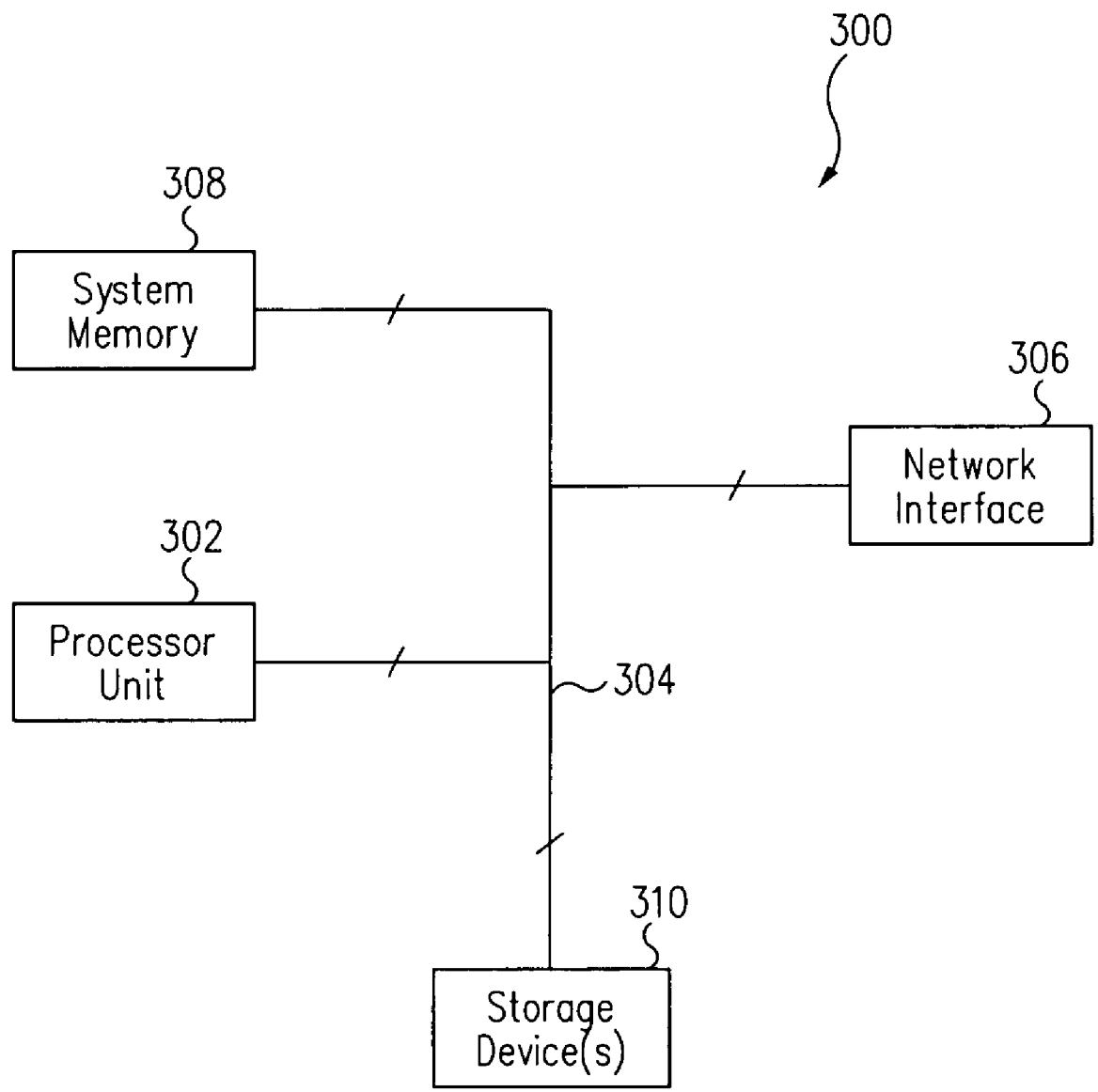
FIG. 3 depicts an electrical block diagram of an exemplary computer system, according to an embodiment of the present invention.

FIG. 3 depicts an exemplary computer system 300 constructed according to various aspects of the present invention. The computer system 300 includes a processor unit 302, which may include multiple processors, a single threaded processor, a multi-threaded processor, a multi-core processor, etc., that implements one or more of the pipelines 100. The computer system 300 also includes a system memory 308 (e.g., one or more cache levels, SRAM, DRAM, RDRAM, EDO RAM, DDR RAM, and/or EEPROM, etc.), a system bus 304 (e.g., LDT, PCI, ISA, etc.), a network interface 306 (e.g., an ATM interface, an Ethernet interface, a Frame Relay interface, etc.), and storage device(s) 310 (e.g., optical storage, magnetic storage, etc.). Computer system realizations of the invention may include fewer or additional components not illustrated in FIG. 3. For example, the system 300 may also include video cards, audio cards, additional network interfaces, peripheral devices, etc. The processor unit 302, the storage device(s) 310, the network interface 306 and the system memory 308 are coupled to the system bus 304, which includes a plurality of address, data and control lines. The processor unit 302 includes the instruction store 106 and a memory interface that couples the instruction store 106 to a memory hierarchy, i.e., the system memory 308. Accordingly, a technique has been described herein that allows a single instruction to accomplish a register move and a dependency check.

While the invention has been described with reference to various realizations, it will be understood that these realizations are illustrative and that the scope of the invention is not limited to them. Many variations, modifications, additions, and improvements are possible. More generally, realizations in accordance with the present invention have been described in the context of particular realizations. For example, the blocks and logic units identified in the description are for understanding the described invention and not meant to limit the described invention. Functionality may be separated or combined in blocks differently in various realizations of the invention or described with different terminology. As used herein, plural instances may be provided for components described herein as a single instance. These and other variations, modifications, additions, and improvements may fall within the scope of the invention as defined in the claims that follow.

What is claimed is:

1. A method of coordinating execution of instructions in a processor that allows the instructions to execute out-of-order, the method comprising:

decoding a particular instruction defined in accordance with an instruction set of the processor; and introducing into a stream of executable operations a corresponding helper sequence of instructions corresponding to the particular instruction, wherein the corresponding helper sequence includes a first artificial dependency instruction that codes a dependency on a register (1) that is not actually employed as a register source or target for an operation performed by execution of the first artificial dependency instruction and (2) that is used as a register source or target by another instruction, in said corresponding helper sequence, preceding said first artificial dependency instruction wherein said first artificial dependency instruction is positioned in said helper sequence to coordinate execution of said helper sequence.

2. The method of claim 1, wherein the first artificial dependency instruction is implemented as an instruction that depends, for readiness to execute, upon plural register sources but employs less than all of the register sources in its computation or data manipulation.

3. The method of claim 1, wherein the first artificial dependency instruction is implemented as a move operation that depends, for readiness to execute, upon plural register sources but employs only one of the registers as a source for the implemented move.

4. The method of claim 1, wherein said processor has an architectural state, and the first artificial dependency instruction is implemented as a no operation (NOP) instruction that depends, for readiness to execute, upon at least one register source but execution of said no operation instruction on said processor performs no computation or data manipulation that alters the architectural state.

5. The method of claim 1, wherein the first artificial dependency instruction is positioned last in the helper sequence to gather dependencies and ensure completion of other instructions of the helper sequence prior to commitment of the particular instruction implemented thereby.

6. The method of claim 1, wherein the helper sequence includes at least an additional second artificial dependency instruction that, together with the first artificial dependency instruction, is employed to expand a set of registers upon which execution of the first artificial dependency instruction ultimately depends.

7. The method of claim 6, wherein said register on which the first artificial dependency instruction codes a dependency comprises a first register source and on a register target of the second artificial dependency instruction which itself codes a dependency on a second register source, such that execution of the first artificial dependency instruction ultimately depends on both the first and second register sources.

8. The method of claim 1, wherein the artificial dependency instruction is positioned between two instructions of the helper sequence to enforce an ordering therebetween.

9. A machine readable storage medium have embedded therein a sequence of machine-readable instructions executable by an out-of-order execution processor to provide a method comprising:
introducing into a stream of executable operations on the processor a helper sequence of instructions that corresponds to a particular instruction defined in accordance with an instruction set of the processor,
the helper sequence including a first artificial dependency instruction that codes a dependency on a register (1) that is not actually employed as a register source or target for the operation performed by execution of the first artificial dependency instruction and (2) that is used as a register source or target by another instruction, in said corresponding helper sequence, preceding said first artificial dependency instruction wherein said first artificial dependency instruction is positioned in said helper sequence to coordinate execution of said helper sequence.

10. The machine readable storage medium of claim 9, wherein the first artificial dependency instruction is implemented as an instruction that depends, for readiness to execute, upon plural register sources but employs less than all of the register sources in its computation or data manipulation.

11. The machine readable storage medium of claim 9, wherein the first artificial dependency instruction is implemented as a move operation that depends, for readiness to execute, upon plural register sources but employs only one of the registers as a source for the implemented move.

12. The machine readable storage medium of claim 9, wherein said processor has an architectural state, and the first artificial dependency instruction is implemented as a no operation (NOP) instruction that depends, for readiness to execute, upon at least one register source but execution of said no operation instruction on said processor performs no computation or data manipulation that alters the architectural state.

13. The machine readable storage medium of claim 9, wherein the first artificial dependency instruction is positioned last in the helper sequence to gather dependencies and ensure completion of other instructions of the helper sequence prior to commitment of the particular instruction implemented thereby.

14. The machine readable storage medium of claim 9, wherein the helper sequence includes at least an additional second artificial dependency instruction that, together with the first artificial dependency instruction, is employed to expand a set of registers upon which execution of the first artificial dependency instruction ultimately depends.

15. The machine readable storage medium of claim 14, wherein said register on which the first artificial dependency instruction codes a dependency comprises a first register source and on a register target of the second artificial dependency instruction which itself codes a dependency on a second register source, such that execution of the first artificial dependency instruction ultimately depends on both the first and second register sources.

16. The machine readable storage medium of claim 9, wherein the artificial dependency instruction is positioned between two instructions of the helper sequence to enforce an ordering therebetween.

17. A processor that allows instructions to execute out-of-order, the processor comprising:
a decode pipe for decoding a particular instruction defined in accordance with an instruction set of the processor; and
a helper store for introducing into a stream of executable operations a helper sequence of instructions corresponding to the particular instruction,
wherein the corresponding helper sequence includes a first artificial dependency instruction that codes a dependency on a register (1) that is not actually employed as a register source or target for the operation performed by execution of the first artificial dependency instruction and (2) that is used as a register source or target by another instruction, in said corresponding helper sequence, preceding said first artificial dependency instruction wherein said first artificial dependency instruction is positioned in said helper sequence to coordinate execution of said helper sequence.

18. The processor of claim 17, wherein the first artificial dependency instruction is implemented as an instruction that depends, for readiness to execute, upon plural register sources but employs less than all of the register sources in its computation or data manipulation.

19. The processor of claim 17, wherein the first artificial dependency instruction is implemented as a move operation that depends, for readiness to execute, upon plural register sources but employs only one of the registers as a source for the implemented move.

20. The processor of claim 17, wherein said processor has an architectural state, and the first artificial dependency instruction is implemented as a no operation (NOP) instruction that depends, for readiness to execute, upon at least one register source but execution of said no operation instruction on said processor performs no computation or data manipulation that alters the architectural state.

21. The processor of claim 17, wherein the first artificial dependency instruction is positioned last in the helper sequence to gather dependencies and ensure completion of other instructions of the helper sequence prior to commitment of the particular instruction implemented thereby.

22. The processor of claim 17, wherein the helper sequence includes at least an additional second artificial dependency instruction that, together with the first artificial dependency instruction, is employed to expand a set of registers upon which execution of the first artificial dependency instruction ultimately depends.

23. The processor of claim 22, wherein said register on which the first artificial dependency instruction codes a dependency comprises a first register source and on a register target of the second artificial dependency instruction which itself codes a register source, such that execution of the first artificial dependency instruction ultimately depends on both the first and second register sources.

24. The processor of claim 17, wherein the artificial dependency instruction is positioned between two instructions of the helper sequence to enforce an ordering therebetween.

25. An apparatus comprising:
means for decoding a particular instruction defined in accordance with an instruction set of the processor; and
means for introducing into a stream of executable operations a corresponding helper sequence of instructions corresponding to the particular instruction, wherein the corresponding helper sequence includes a first artificial dependency instruction that codes a dependency on a register (1) that is not actually employed as a register source or target for an operation performed by the particular instruction by execution of the first artificial dependency instruction and (2) that is used as a register source or target by another instruction, in said corresponding helper sequence, preceding said first artificial dependency instruction wherein said first artificial dependency instruction is positioned in said helper sequence to coordinate execution of said helper sequence.

* * * * *